(12) United States Patent
Leeson et al.

(10) Patent No.: US 12,504,595 B2
(45) Date of Patent: Dec. 23, 2025

(54) FIBER REEL AND DEMARCATION BOX ASSEMBLY WITH REEL CONTROLLER AND/OR REVERSIBLE COVER

(71) Applicant: PPC BROADBAND FIBER LTD., Woodbridge (GB)

(72) Inventors: Kim Leeson, Ipswich (GB); Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 253 days.

(21) Appl. No.: 18/073,934

(22) Filed: Dec. 2, 2022

(65) Prior Publication Data

US 2023/0176308 A1 Jun. 8, 2023

Related U.S. Application Data

(60) Provisional application No. 63/285,589, filed on Dec. 3, 2021.

(51) Int. Cl.
*G02B 6/44* (2006.01)

(52) U.S. Cl.
CPC .................. *G02B 6/4457* (2013.01)

(58) Field of Classification Search
CPC .................................................. G02B 6/4457
See application file for complete search history.

(56) References Cited

U.S. PATENT DOCUMENTS

| 6,416,009 B1 * | 7/2002 | Iaciofano | B65H 75/4463 242/384.7 |
| 2001/0019002 A1 * | 9/2001 | Walters | H02G 11/02 191/12.4 |
| 2008/0118207 A1 * | 5/2008 | Yamamoto | G02B 6/44528 385/88 |

(Continued)

FOREIGN PATENT DOCUMENTS

| EP | 3286589 A2 | 2/2018 |
| KR | 20120122775 A | 11/2012 |
| WO | 2016170171 A2 | 10/2016 |

OTHER PUBLICATIONS

International Search Report and Written Opinion dated Feb. 22, 2023 in corresponding International Application No. PCT/IB2022/061730, 14 pages.

*Primary Examiner* — Charlie Y Peng
(74) *Attorney, Agent, or Firm* — MH2 TECHNOLOGY LAW GROUP LLP

(57) ABSTRACT

A fiber optic enclosure assembly for housing optical fiber connections includes: a housing portion; a bearing mount portion disposed within the housing portion; and a cable reel portion disposed within the housing portion. The cable reel portion is configured to be engaged with the bearing mount portion such that the cable reel portion selectively rotates; the cable reel portion is configured to be selectively rotatable in only a counterclockwise direction or only in a clockwise direction depending on the position of a latch portion; and the position of the latch portion is configured to permit the (Continued)

cable reel portion to rotate in only a selected one of the counterclockwise direction and the clockwise direction such that a cable can be paid out from the cable reel portion or wrapped onto the cable reel portion and the cable is prevented from unwinding in a direction opposite to the selected direction.

19 Claims, 9 Drawing Sheets

(56) References Cited

U.S. PATENT DOCUMENTS

| | | |
|---|---|---|
| 2011/0311226 A1 | 12/2011 | Smith et al. |
| 2015/0102151 A1* | 4/2015 | Skowronski ............ H02G 11/02 242/394 |
| 2016/0050774 A1* | 2/2016 | Merenda ............ B65H 75/4431 224/162 |
| 2018/0172939 A1* | 6/2018 | Kowalczyk ........ G02B 6/44528 |

* cited by examiner

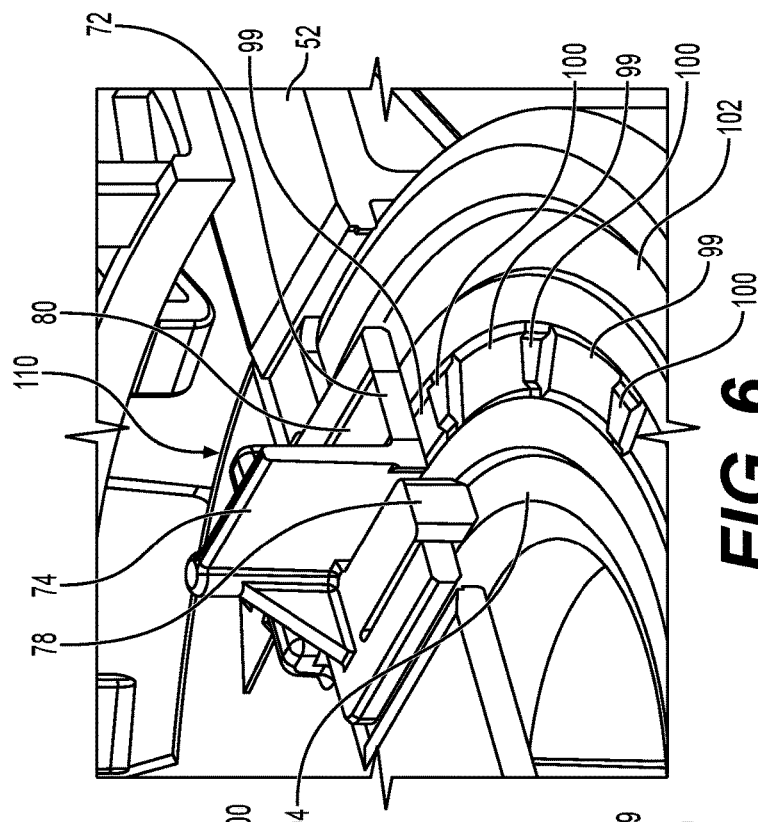
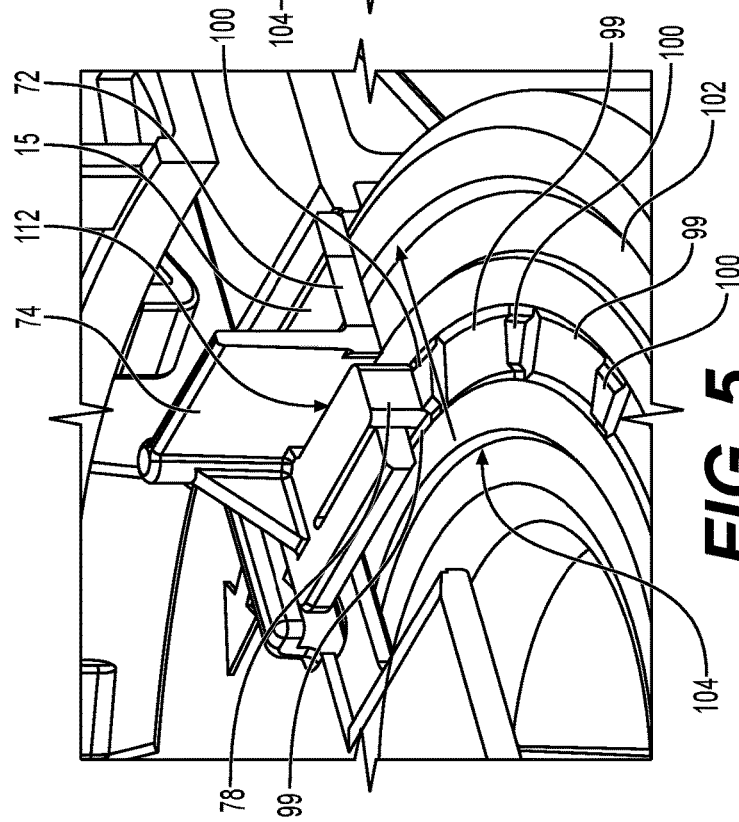
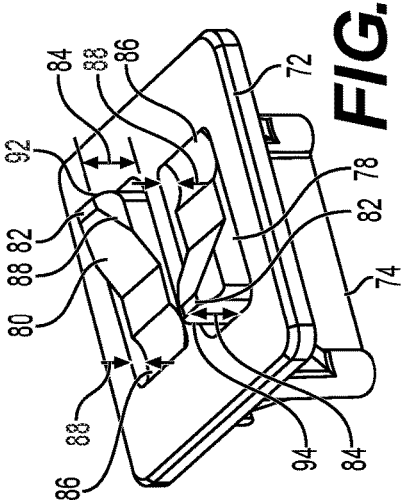
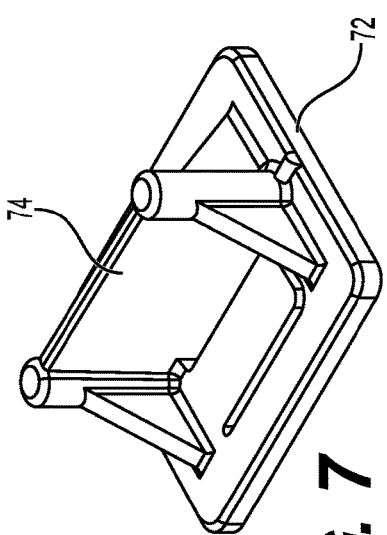

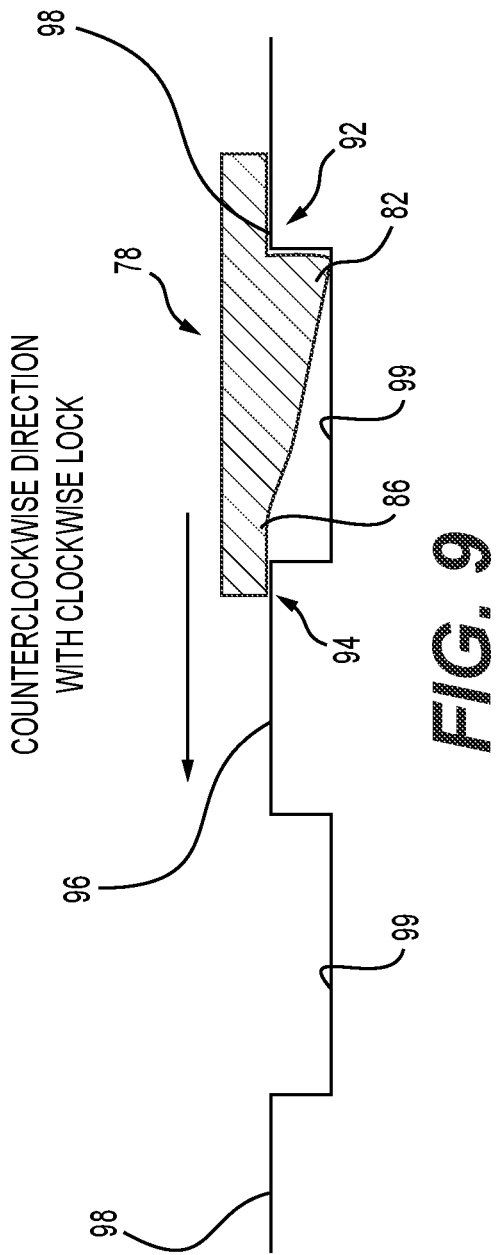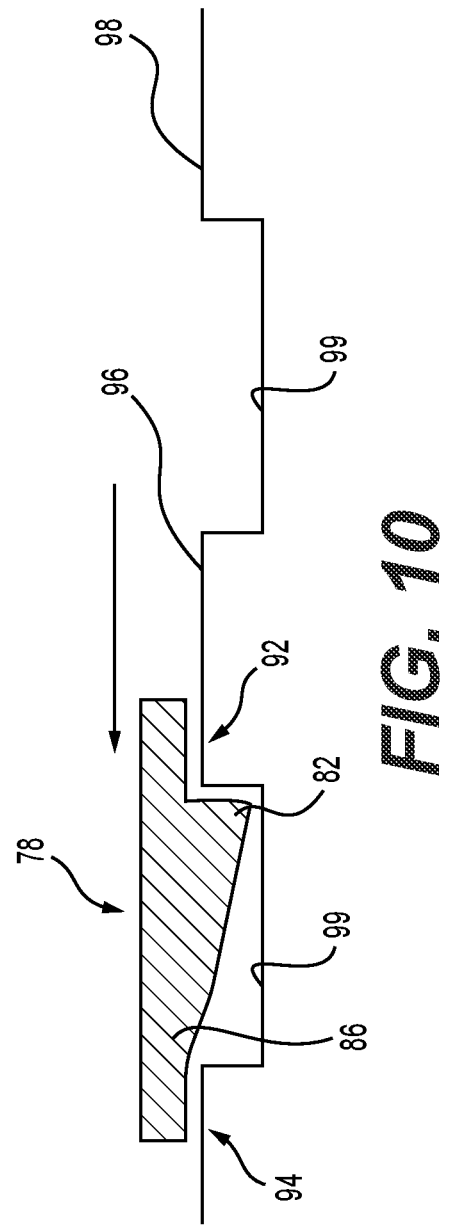

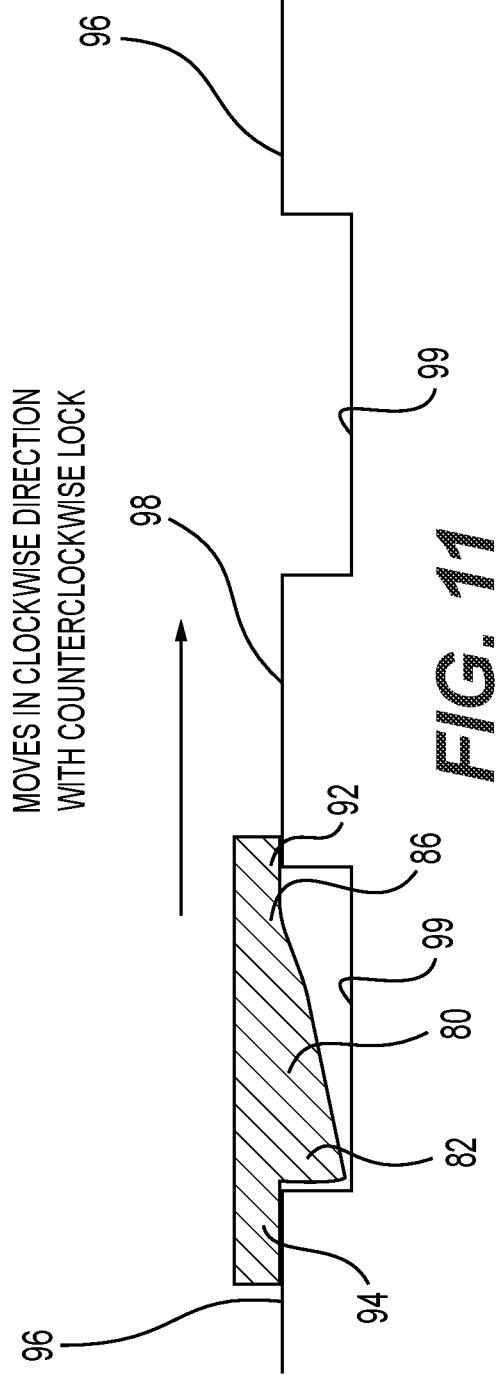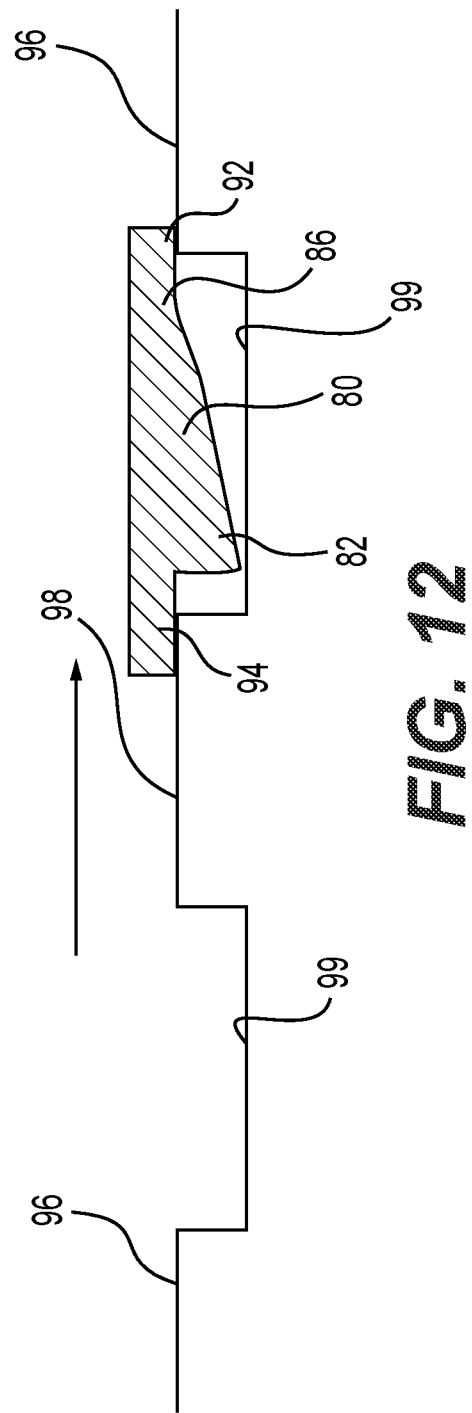

FIBER REEL AND DEMARCATION BOX ASSEMBLY WITH REEL CONTROLLER AND/OR REVERSIBLE COVER

CROSS-REFERENCE TO RELATED APPLICATION

This application claims the benefit of U.S. Provisional Application No. 63/285,589, which was filed on Dec. 3, 2021, the disclosure of which is hereby incorporated by reference herein in its entirety.

TECHNICAL FIELD

This disclosure relates generally to the field of apparatuses for the installation of optical access networks. In particular, this disclosure relates to a single or multi-fiber reel and demarcation box assembly that is configured to store slack in a drop cable and prevent recoil of the drop cable within the box.

BACKGROUND

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

An optical FTTP or FTTH network typically includes a fiber distribution hub (FDH), which is typically located in the basement or vault of a multi-dwelling unit building in which the end users reside. A multi-fiber distribution cable typically leads out of the distribution hub to a fiber connection point that is typically located remote from the distribution hub. At the distribution hub, the distribution cable can be connected optically to one or more drop cables. As used herein, a "drop cable" is an optical fiber cable that typically runs towards an apartment or office of an end user. To connect the distribution cable to the drop cables, a number of optical fibers are broken out of the distribution cable and into a same number of single-fiber cables that are each terminated with an optical fiber connector. Each drop cable is then typically terminated in a termination box located in the proximity of or inside an apartment or office of an end user. A building may include a single FDH for the entire building, or one FDH per floor, or any combination in between, depending on the fiber connection needs and capacity of the building.

When installing an FDH, it is difficult for a technician to determine the length of input fiber cable needed to connect the FDH to a fiber connection point, which is usually outdoors where the connections to the larger fiber networks (e.g., a city-wide fiber network) are made. In some installations, the fiber connection point could also be within the same building, perhaps on another floor or in the basement of the building. Regardless of the location of the fiber connection point, it is typically necessary to physically locate the FDH before the required length of input fiber cable between the FDT and the fiber connection point is known. As a result, the technician needs to approximate the length of input fiber cable to the fiber connection point and prepare that length of the input fiber cable before installing the FDH.

If the approximated length is too short, the technician must then splice the approximated length of input fiber cable with another length of input fiber cable. On the other hand, if the approximated length is too long, the excess slack of the input fiber cable must be stored somewhere along the length of fiber cable. If not properly stored, unwanted bends and thus unwanted bend loss can be introduced into the fiber cable path.

Although it is convenient for a technician to secure the FDH to its permanent location before connecting the input fiber cable to the fiber connection point, conventional FDHs include an adapter plate mounted to the spool of fiber cable such that the adapter plate will rotate with the spool when the input fiber cable is deployed from the spool to the fiber connection point. Thus, although the terminated breakout cables can be connected to the adapter plate before the input fiber cable is deployed from the spool to the fiber connection point, the drop cables that run from the FDH to an apartment or office of an end user cannot be connected until after the input fiber cable is deployed from the spool to the fiber connection point because the adapter plate rotates with the spool and would damage the drop cables.

Therefore, it may be desirable to provide a fiber reel and demarcation box assembly that permits a technician to connect one or more drop cables to the adapters in advance of the fiber cable being deployed or paid out from the reel to a remote fiber connection of a FTTX application and keep the drop cables connected to the adapters while the reel is being rotated to deploy or pay out the multi-fiber cable to the remote fiber connection. It may also be desirable to provide a multi-fiber reel and adapter assembly that keeps the adapters stationary while the reel is permitted to turn to deploy or pay out the multi-fiber cable. It may also be desirable to provide a multi-fiber reel and adapter assembly that includes a reel that holds the multiple connectors of breakout cables that are broken out from the multi-fiber cable while the reel is being rotated to deploy or pay out the multi-fiber cable to the remote fiber connection.

It may be desirable to provide a multi-fiber reel and adapter assembly where the position of a latch is configured to permit a cable reel to rotate in only a selected one of a counterclockwise direction and a clockwise direction such that a cable can be paid out from the cable reel or wrapped onto the cable reel and the cable is prevented from unwinding in a direction opposite to the selected direction.

SUMMARY

A fiber optic enclosure assembly for housing optical fiber connections includes a housing, a first panel (such as, for example, a center hub), a cable reel and a cover. The first panel may be disposed within the housing and may include a bearing mount disposed about an axis. The cable reel may be engaged with the bearing mount such that the cable reel selectively rotates about the axis. The cable reel includes a latching member that moves between a first position and a second position. The cable reel is configured to solely rotate in a counterclockwise direction when the latching member is in the first position and the cable reel is configured to solely rotate in a clockwise direction when the latching member is in the second position.

Embodiments provide input openings for a drop cable to enter the enclosure on opposite ends of a bottom of the enclosure. In some installations, it may be advantageous for the drop cable to enter near the left side of the enclosure, while in other installations, it may be advantageous for the drop cable to enter near the right side of the enclosure. Drop cables (or other cables) can tend to produce a recoil action (a tendency to uncoil) when coiled for storage. Embodiments provide a solution to recoil by providing selective prevention of clockwise or counterclockwise rotation the cable reel, depending on the coiling direction of the drop cable.

The fiber optic enclosure assembly may further include a pivotable tray that is mounted to the first panel. The pivotable tray, the first panel and the cable reel may be enclosed by the housing and a cover which is configured to be removably affixed to the housing.

The latching member may be moveably affixed to a first upper flange of the cable reel and at least a portion of the latching member may be configured to be received within a slot defined by the bearing mount. The latching member may include a latching body, a tab, and a clockwise wedge and a counterclockwise wedge. A first exterior side of the latching body includes the tab, and a second interior side of the latching member includes the clockwise wedge and the counterclockwise wedge.

The counterclockwise wedge of the latching member may be configured to be received within the slot defined by the bearing mount when the latching member is moved to the first position, and the clockwise wedge is configured to be received within the slot defined by the bearing mount when the latching member is moved to the second position. The bearing mount defines a plurality of alternating slots and lateral protrusions.

The clockwise wedge includes a peak region defined at a counterclockwise edge and a valley region defined at a clockwise edge. The counterclockwise wedge includes a peak region defined at a clockwise edge and a valley region defined at a counterclockwise edge. The peak region of the counterclockwise wedge is configured to abut a protrusion defined in the bearing mount so as to prevent the cable reel from rotating in the clockwise direction. The peak region of the clockwise wedge is configured to abut a protrusion defined in the bearing mount so as to prevent the cable reel from rotating in the counterclockwise direction. Each valley region of the clockwise wedge and the counterclockwise wedge is configured to allow each wedge to slide over a protrusion defined in the bearing mount.

According to various embodiments of the disclosure, a fiber optic enclosure assembly for housing optical fiber connections includes: a base; a first panel disposed within the base and including a bearing mount disposed about an axis; a cable reel configured to be engaged with the bearing mount such that the cable reel selectively rotates about the axis; and a pivotable second panel configured to be engaged with the first panel; wherein the second panel is configured to be stationary relative to the base.

According to various aspects of the above embodiments of the fiber optic enclosure assembly, the second panel is configured to receive a cable adapter that is fixed relative to the second panel.

According to various aspects of the above embodiments of the fiber optic enclosure assembly, the cable reel includes a reel controller that moves between a first position and a second position.

According to various aspects of the above embodiments of the fiber optic enclosure assembly, the cable reel is permitted to rotate in a counterclockwise direction and prevented from rotating in a clockwise direction when the reel controller is in the first position.

According to various aspects of the above embodiments of the fiber optic enclosure assembly, the cable reel is permitted to rotate in the clockwise direction and prevented from rotating in the counterclockwise direction when the reel controller is in the second position.

According to various aspects of the above embodiments of the fiber optic enclosure assembly, the reel controller is configured to be attached to a flange of the cable reel.

According to various aspects of the above embodiments of the fiber optic enclosure assembly, the reel controller includes a body and a tab extending from the body.

According to various aspects of the above embodiments of the fiber optic enclosure assembly, the reel controller includes a clockwise wedge that extends from the body and is configured to elastically move relative to the body.

According to various aspects of the above embodiments of the fiber optic enclosure assembly, the reel controller includes a counterclockwise wedge that extends from the body and is configured to elastically move relative to the body.

According to various aspects of the above embodiments of the fiber optic enclosure assembly, the reel controller is configured to be received within a slot in the bearing mount.

According to various aspects of the above embodiments of the fiber optic enclosure assembly, the counterclockwise wedge is configured to be received within the slot in the bearing mount when the latch is in the first position.

According to various aspects of the above embodiments of the fiber optic enclosure assembly, the clockwise wedge is configured to be received within the slot in the bearing mount when the latch is in the second position.

According to various aspects of the above embodiments of the fiber optic enclosure assembly, the tab is configured to extend from a first side of the body, and the clockwise wedge and the counterclockwise wedge are configured to extend from a second side of the body opposite the first side of the body.

According to various aspects of the above embodiments of the fiber optic enclosure assembly, the position of the reel controller is configured to permit the cable reel to rotate in only a selected one of the counterclockwise direction and the clockwise direction such that a cable can be paid out from the cable reel or wrapped onto the cable reel without disturbing an end of the cable that is connected to the enclosure assembly, and the cable is prevented from unwinding in a direction opposite to the selected direction.

According to various aspects of the above embodiments of the fiber optic enclosure assembly, the clockwise wedge includes a peak region at a first edge and a valley region at a second edge opposite to the first edge, and the counterclockwise wedge includes a peak region at a first edge and a valley region at a second edge opposite to the first edge.

According to various aspects of the above embodiments of the fiber optic enclosure assembly, the peak region of the counterclockwise wedge is configured to abut a protrusion in the slot in the bearing mount so as to prevent the cable reel from rotating in the clockwise direction, and wherein the peak region of the clockwise wedge is configured to abut a protrusion in the slot in the bearing mount so as to prevent the cable reel from rotating in the counterclockwise direction.

According to various aspects of the above embodiments of the fiber optic enclosure assembly, the real controller is a latch.

According to various aspects of the above embodiments of the fiber optic enclosure assembly, the slot in the bearing mount defines a plurality of openings alternating with a plurality of the protrusion.

According to various aspects of the above embodiments of the fiber optic enclosure assembly, the openings are configured to permit the peak regions to move in the slot.

According to various aspects of the above embodiments of the fiber optic enclosure assembly, the protrusions are configured to prevent the peak regions to move in the slot.

According to various embodiments of the disclosure, a fiber optic enclosure assembly for housing optical fiber connections includes: a base portion; a first panel portion disposed within the base portion; a cable reel portion disposed within the base portion; and a tray portion configured to be coupled with the base portion and engage with the first panel portion.

According to various aspects of the above embodiments of the fiber optic enclosure assembly, the tray portion is configured to receive a cable adapter portion that is fixed relative to the tray portion.

According to various aspects of the above embodiments of the fiber optic enclosure assembly, the first panel portion includes a receiving portion disposed about an axis.

According to various aspects of the above embodiments of the fiber optic enclosure assembly, the cable reel portion includes a reel controller.

According to various aspects of the above embodiments of the fiber optic enclosure assembly, the reel controller is configured to be engaged with the receiving portion such that the cable reel portion selectively rotates about the axis.

According to various aspects of the above embodiments of the fiber optic enclosure assembly, the reel controller includes an engagement portion that is configured to move between a first position and a second position.

According to various aspects of the above embodiments of the fiber optic enclosure assembly, the position of the engagement portion is configured to permit the cable reel portion to rotate in only a selected one of the counterclockwise direction and the clockwise direction such that a cable can be paid out from the cable reel portion or wrapped onto the cable reel portion without disturbing an end of the cable that is connected to the enclosure assembly, and the cable is prevented from unwinding in a direction opposite to the selected direction.

According to various aspects of the above embodiments of the fiber optic enclosure assembly, the cable reel portion is permitted to rotate in a counterclockwise direction and prevented from rotating in a clockwise direction when the engagement portion is in the first position.

According to various aspects of the above embodiments of the fiber optic enclosure assembly, the cable reel portion is permitted to rotate in the clockwise direction and prevented from rotating in the counterclockwise direction when the engagement portion is in the second position.

According to various aspects of the above embodiments of the fiber optic enclosure assembly, the engagement portion includes a body portion and a tab portion extending from the body portion.

According to various aspects of the above embodiments of the fiber optic enclosure assembly, the tab portion extends from a first side of the body portion, and a first engagement structure and a second engagement structure extend from a second side of the body portion opposite the first side of the body portion.

According to various aspects of the above embodiments of the fiber optic enclosure assembly, the first engagement structure extends from the body portion and is configured to elastically move relative to the body portion, and the second engagement structure extends from the body portion and is configured to elastically move relative to the body portion.

According to various aspects of the above embodiments of the fiber optic enclosure assembly, the tray portion is configured to pivot relative to the base portion.

According to various aspects of the above embodiments of the fiber optic enclosure assembly, the engagement portion is configured to be moveably attached to a flange portion of the cable reel portion.

According to various aspects of the above embodiments of the fiber optic enclosure assembly, the receiving portion is a bearing mount portion.

According to various aspects of the above embodiments of the fiber optic enclosure assembly, the engagement portion is configured to be received within an engagement feature of the bearing mount portion.

According to various aspects of the above embodiments of the fiber optic enclosure assembly, the second engagement structure is configured to be received within the engagement portion in the bearing mount portion when the latch portion is in the first position.

According to various aspects of the above embodiments of the fiber optic enclosure assembly, the first engagement structure is configured to be received within the engagement feature in the bearing mount portion when the latch portion is in the second position.

According to various embodiments of the disclosure, a fiber reel and breakout adapter for selectively controlling only loading or only unloading of the fiber reel from the breakout adapter includes a cable reel portion configured to move in a loading direction, where cable is loaded onto the cable reel portion, and an unloading direction, where cable is unloaded from the cable reel portion; and a reel controller configured to selectively move between a first position, where the reel controller allows the cable reel portion to move in the loading direction and prevents the cable reel portion from moving in the unloading direction, and a second position, where the reel controller allows the cable reel portion to move in only the unloading direction and prevents the cable reel portion from moving in the loading direction.

According to various aspects of the above embodiments of the fiber reel and breakout adapter, the reel controller comprises a latch portion that includes a first engagement structure and a second engagement structure.

According to various aspects of the above embodiments of the fiber reel and breakout adapter, the reel controller comprises a latch portion that is configured to attach to the cable reel portion.

According to various aspects of the above embodiments of the fiber reel and breakout adapter, the latch portion is configured to engage a bearing mount portion.

According to various aspects of the above embodiments of the fiber reel and breakout adapter, the bearing mount portion and the cable reel portion are enclosed by a base portion and a cover portion attached to the base portion.

According to various aspects of the above embodiments of the fiber reel and breakout adapter, the fiber reel and breakout adapter further comprising a pivotable tray portion configured to engage the bearing mount portion so as to selectively pivot relative to a base portion.

According to various aspects of the above embodiments of the fiber reel and breakout adapter, the pivotable tray portion is configured to receive a cable adapter portion that is fixed relative to the pivotable tray portion.

According to various aspects of the above embodiments of the fiber reel and breakout adapter, the second engagement structure is configured to be received within a recess in the bearing mount portion when the latch portion is in the first position.

According to various aspects of the above embodiments of the fiber reel and breakout adapter, the first engagement structure is configured to be received within the recess in the bearing mount portion when the latch portion is in the second position.

BRIEF DESCRIPTION OF THE DRAWINGS

Further advantages and features of the present disclosure will become apparent from the following description and the accompanying drawings, to which reference is made. In which are shown:

FIG. 5 is a partial perspective view of the fiber optic enclosure of FIG. 4 with a latching member shown in cross section and in a position where the reel moves in a counterclockwise direction relative to the hub and housing.

FIG. 6 is a partial perspective view of the fiber optic enclosure of FIG. 4 with the latching member shown in cross-section and in a position where the reel moves in a clockwise direction relative to the hub and housing.

FIG. 7 is a top perspective view of an exemplary latching member in accordance with various aspects of the disclosure.

FIG. 8 is a bottom perspective view of the latching member of FIG. 7.

FIG. 9 is a cross-sectional view of the latching member and the hub where the latching member is in a position where the reel moves in a counterclockwise direction relative to the hub and housing.

FIG. 10 is a cross-sectional view of the latching member and the hub where the latching member is in a position where the reel moves in a counterclockwise direction relative to the hub and housing.

FIG. 11 is a cross-sectional view of the latching member and the hub where the latching member is in a position where the reel moves in a clockwise direction relative to the hub and housing.

FIG. 12 is a cross-sectional view of the latching member and the hub where the latching member is in a position where the reel moves in a clockwise direction relative to the hub and housing.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this present disclosure pertains.

Figure 1:
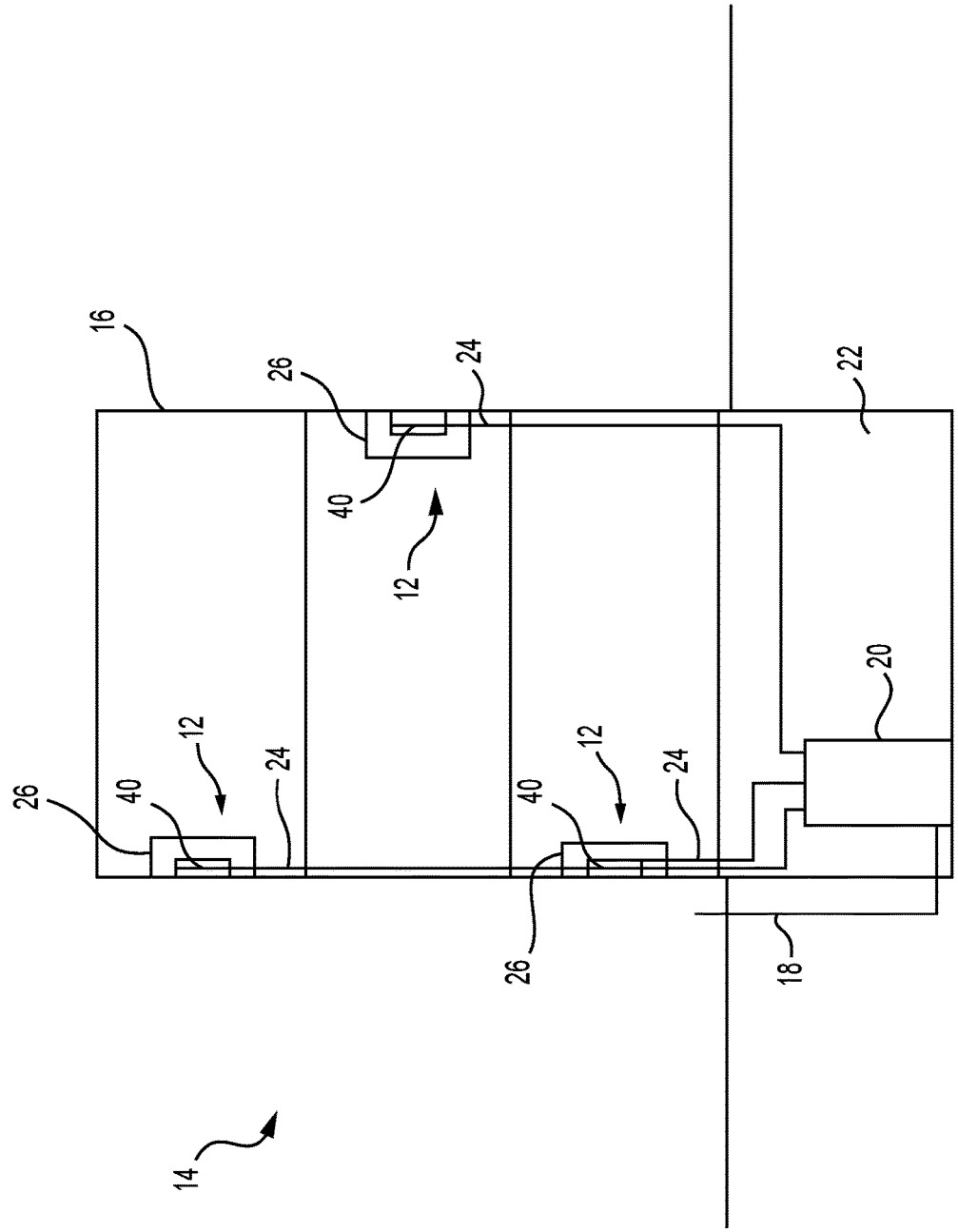
FIG. 1 is a schematic representation of a fiber optic network that includes an exemplary fiber optic enclosure having features that are examples of inventive aspects in accordance with various aspects of the disclosure.

Embodiments provide a multi-fiber reel and adapter assembly where the position of a latch is configured to permit a cable reel to rotate in only a selected one of a counterclockwise direction and a clockwise direction such that a cable can be paid out from the cable reel or wrapped onto the cable reel and the cable is prevented from unwinding in a direction opposite to the selected direction Referring now to FIG. 1, a schematic representation of a fiber optic network, generally designated 14, in a facility 16 (e.g., individual residence, apartment, condominium, business, etc.) is shown. The fiber optic network 14 includes a feeder cable 18 from a central office (not shown). The feeder cable 18 enters a feeder cable input location 20 (e.g., a fiber distribution hub, a network interface device, etc.) having one or more optical splitters (e.g., 1-to-8 splitters, 1-to-16 splitters, or 1-to-32 splitters) that generate a number of individual fibers. In the subject embodiment, and by way of example only, the fiber distribution hub 20 is located on a lower level 22 of the facility 16. Each unit in the facility 16 includes a fiber optic enclosure, generally designated 12, with a subscriber cable (drop cable) 24 extending from each of the fiber optic enclosures 12 to the fiber distribution hub 20. The subscriber cable 24 extending between the fiber distribution hub 20 and the fiber optic enclosure 12 can include a single or multiple optical fibers.

Figure 2:
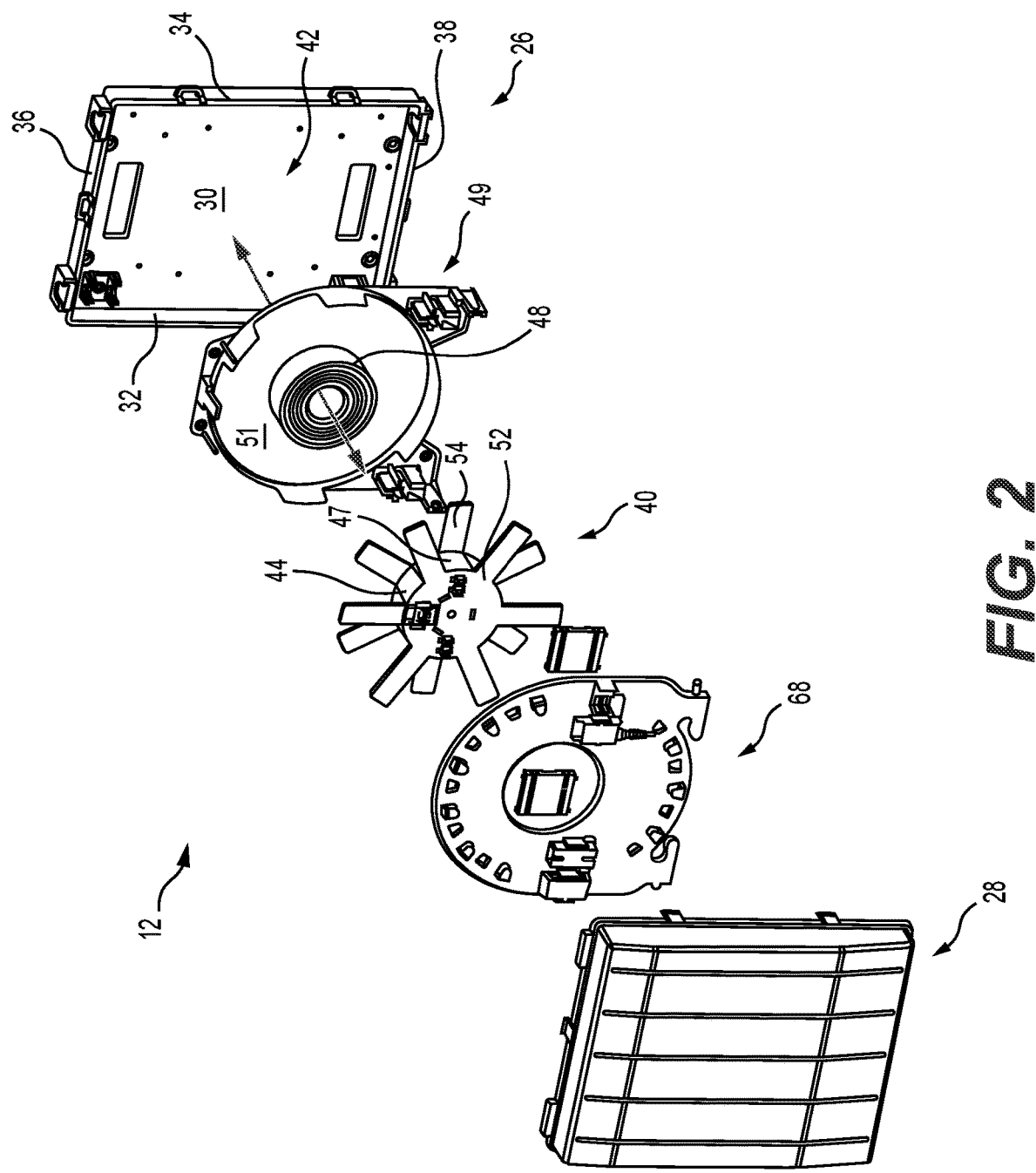
FIG. 2 is an expanded view of an exemplary fiber optic enclosure in accordance with various aspects of the disclosure.
Figure 4:
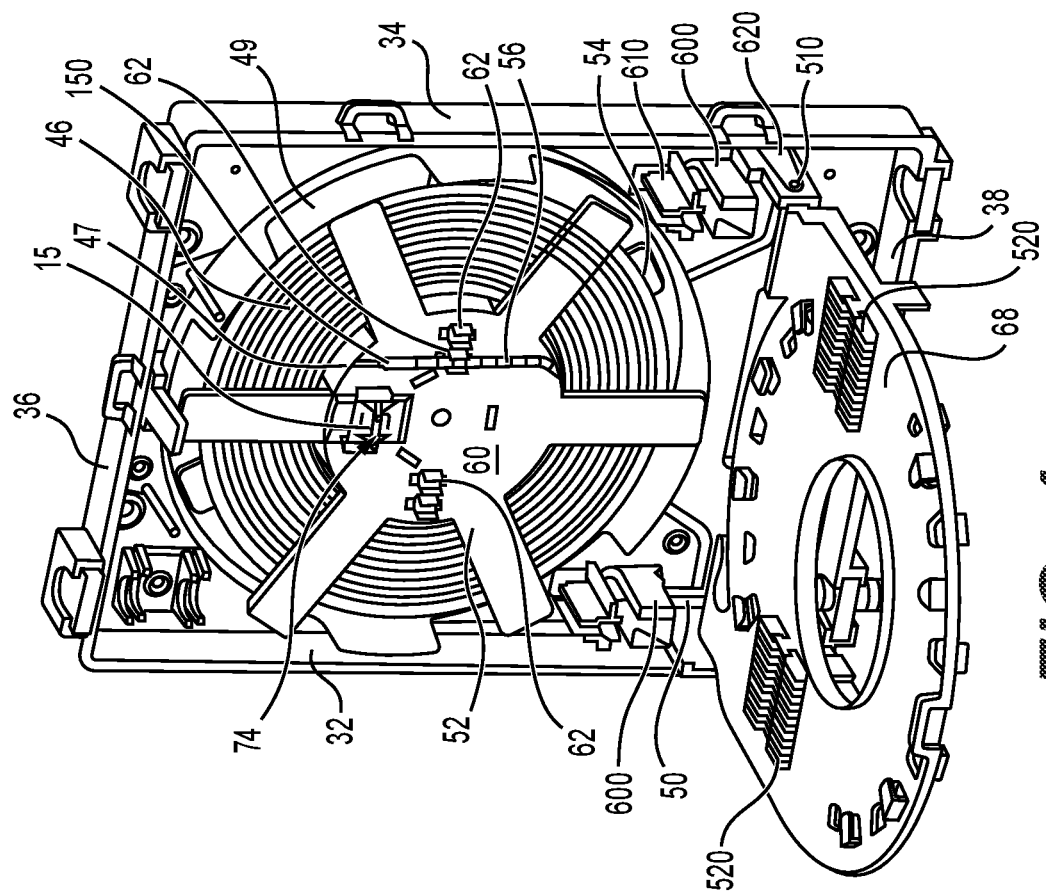
FIG. 4 is perspective view of the fiber optic enclosure of FIG. 2 in a partial assembled state with the pivotable tray in an open position.
Figure 3:
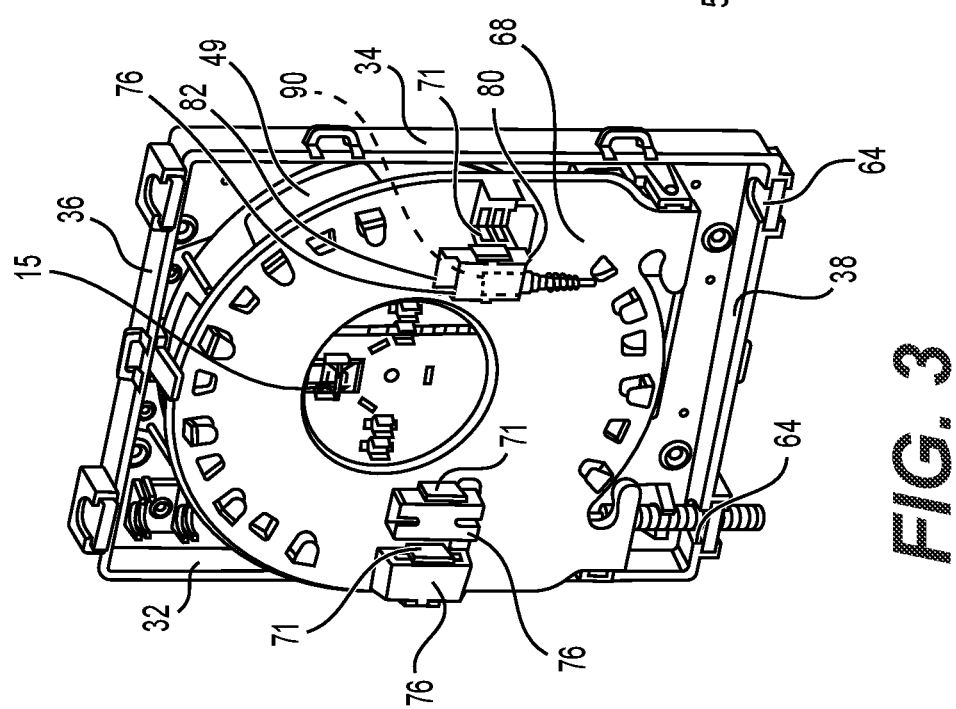
FIG. 3 is a perspective view of the fiber optic enclosure of FIG. 2 in a partial assembled state with the pivotable tray in a closed position.

Referring now to FIGS. 2-4, an exemplary fiber optic enclosure 12 will now be described. The fiber optic enclosure 12 includes a housing having a base 26 and a cover 28. The base 26 includes a base wall 30, a first sidewall 32, and an oppositely disposed second sidewall 34. The first and second sidewalls 32, 34 extend outwardly from the base wall 30 such that the base wall 30 and the first and second sidewalls 32, 34 cooperatively define an interior region 42.

In the subject embodiment, the cover 28 is engaged with a sidewall 36 that is connected to the base wall 30 and the first and second sidewalls 32, 34.

A cable reel, generally designated 40, is disposed in the interior region 42 of the fiber optic enclosure 12. The cable reel 40 includes a hub portion 44, around which a subscriber cable 46 (for example, subscriber cable 24) is coiled (shown schematically in FIG. 4). As shown, a first panel 49 is disposed in the base 26 adjacent to the base wall 30. A bearing mount 48 extends from a rear wall 51 of the first panel 49 into the interior region 42 and is configured to rotatably receive the cable reel 40. It should be appreciated that, in some aspects, the base 26 can be closed by a door, panel, or the cover 28 if it is desired to prevent access to the interior region 42 of the base 26 and/or if it is desired to shield the interior region 42 of the base 26 from the environment (e.g., dust, moisture, etc.).

Embodiments provide input openings 64 for the subscriber cable 46 to enter the enclosure 12 on opposite ends of a bottom wall 38 of the base 26. In some installations, it may be advantageous for the subscriber cable to enter near the left side of the enclosure 12, while in other installations, it may be advantageous for the subscriber cable 46 to enter near the right side of the enclosure 12. Optical subscriber cables (or other cables) can tend to produce a recoil action (a tendency to uncoil) when coiled for storage. Embodiments provide a solution to recoil by providing selective prevention of clockwise or counterclockwise rotation the cable reel, depending on the entry point, and thus the coiling direction, of the subscriber cable 46.

In this example, a pivotable second panel (such as, for example, a tray) 68 is pivotally affixed to the first panel 49 such that the cable reel 40 and coiled subscriber cable 46 is enclosed by the pivotable tray 68 and the first panel 49 when the pivotable tray 68 is in the closed position (as shown in FIG. 3). When the pivotable tray 68 is in an open position (as shown in FIG. 4), the cable reel 40 and subscriber cable 46 are exposed. In embodiments, as shown in FIG. 4, the pivotable tray 68 includes two pins 510 that each engage a receptacle, such as, for example, a hole, 620 in the first panel 49 such that the pivotable tray 68 pivots relative to the first panel 49. Also shown in FIG. 4 are two cable locks 600 that are, in this example, integral to the first panel 49. Each of the cable locks 600 has, in this example, a pair of teeth 610 that are configured to grip a cable (particularly a cable with ridges or ribs) by applying pressure to the cable when the cable is pulled in a direction out of the base 26. The cable locks 600 provide a form of resistance to the cable being pulled out of the base 26 in addition to the reel controller described below. As shown in FIG. 4, two splice trays 520 are attached to the pivotable tray 68 to hold splices such as, for example, those between the subscriber cable 46 and pigtails that lead to adapters 76 mounted to pivotable tray 68.

As shown in FIGS. 1-4, the subscriber cable 46 is a fiber cable that is wound onto the reel 40. The reel 40 includes a hub portion 44 having an outer rim portion 47, and a pair of reel flanges 52, 54 extending radially outward from the outer rim portion 47. The reel flanges 52, 54 may have an asterisk configuration, a circular configuration, triangular configuration, or some other configuration. The reel 40 can be rotatably mounted to the bearing mount 48 so as to rotate about an axis (as shown in FIG. 2) that extends through the bearing mount 48.

The outer rim portion 47 defines an outer circumferential surface about which the subscriber cable 46 can be wound. The reel flanges 52, 54 prevent the subscriber cable 46 from sliding off the outer rim portion 47 in the axial direction of the reel 40. The reel flanges 52, 54 have open areas between fingers of the reel flanges 52, 54 through which the subscriber cable 46 can pass from a space between the reel flanges 52, 54 to a space outside of the reel flanges 52, 54 in the axial direction of the reel 40, as illustrated in FIG. 4.

As illustrated, the reel flange 54 is adjacent a rear wall 51 of the first panel 49. The reel flange 52 is spaced from the reel flange 54 and the rear wall 51 of the first panel 49 in the interior region 42 of the base 26. A reel controller (such as, for example, a latching member) 15 may be configured to selectively limit rotation of the reel 40 relative to the rear wall 51 of the first panel 49.

In this example, the latching member 15 is movably affixed to the flange 52 and engages with the first panel 49 to selectively limit rotation of the reel 40 relative to the rear wall 51 of the first panel 49 in a specific direction. As shown in FIGS. 7 and 8, the latching member 15 is shown having a tab 74 on a first side of a latching body 72 and a pair of resilient, flexible wedge members on a second side the latching body 72. The pair of wedge members includes a counterclockwise wedge 78 and a clockwise wedge 80. The tab 74, the counterclockwise wedge 78 and the clockwise wedge 80 may be integral to the latching body 72. The clockwise wedge 80 defines a peak region 82 which has a maximum height 84 at the counterclockwise edge 92 and defines a valley region 86 at the clockwise edge 88. The counterclockwise wedge 78 defines a peak region 82 which defines a maximum height 84 at the clockwise edge 94 and defines a valley region 86 at the counterclockwise edge 88.

In the example shown in FIGS. 6, 11, and 12, when the tab 74 is pushed to move the latching member 15 into a first position 110 (shown in FIG. 6), the clockwise wedge 80 engages with a slot 99 defined in the bearing mount 48 of the first panel 49 such that the peak region 82 of the clockwise wedge 80 abuts a first lateral protrusion 96 (see FIG. 11) on the bearing mount 48 of the first panel 49. Also, as shown in FIG. 11, the valley region 86 of the clockwise wedge 80 is proximate to a second lateral protrusion 98 such that the reel 40 may still rotate in a clockwise direction (by allowing the second lateral protrusion 98 to slide past both the valley region 86 and the peak region 82 of the clockwise wedge 80) to the position shown in FIG. 12.

However, it is understood that when the tab 74 is in the first position 110 (as shown in FIG. 6), the reel 40 is prevented from rotating in a counterclockwise direction because the peak region 82 of the clockwise wedge 80 (which abuts lateral slot protrusion 96) prevents the adjacent lateral slot protrusion 96 (see FIG. 11) from moving relative to the peak region 82 of the clockwise wedge 80. It is understood that it is only possible for the lateral slot protrusions 96, 98 to move relative to the clockwise wedge 80 in a clockwise direction when the lateral slot protrusion 96, 98 are each adjacent to the valley region 86 (see FIGS. 11 and 12) of the clockwise wedge 80. As the height of the clockwise wedge 80 gradually increases from the valley region 86 to the peak region 82, the clockwise wedge 80 including the peak region 82 (and the reel 40) may rotate relative to the lateral slot protrusions 96, 98 of the hub 48 in a clockwise direction. (See FIGS. 11 and 12).

As shown in FIG. 6, when the tab 74 is in the first position 110, the clockwise wedge 80 engages with the slot(s) 99 of the bearing mount 48 of the first panel 49, the counterclockwise wedge 78 may be disposed in an inner groove 104 defined in the bearing mount 48. However, as shown in FIG. 5, when the counterclockwise wedge 78 engages with the slots 99, the clockwise wedge 80 may be disposed in an outer groove 102 defined in the bearing mount 48.

With reference to FIGS. 5, 9, and 10, when the tab 74 is pushed to move the latching member 15 into a second position 112 (shown in FIG. 5), the counterclockwise wedge 78 engages with the slot 99 defined in the bearing mount 48 as shown. The counterclockwise wedge 78 engages with slots 99 defined in the bearing mount 48 such that the peak region 82 of the counterclockwise wedge 78 abuts a second lateral protrusion 98 (see FIG. 9) on the bearing mount 48 and the valley region 86 of the counterclockwise wedge 78 is proximate to the first lateral protrusion 96 (see FIG. 9) such that the reel 40 may still rotate in a clockwise direction (by allowing both the valley region 86 and the peak region 82 of the counterclockwise wedge 78 to rotate past the first lateral protrusion 96 to the position shown in FIG. 10).

However, it is understood that when the tab 74 is in the second position 112 (as shown in FIG. 5), the reel 40 is prevented from rotating in a clockwise direction because the engagement between the protrusion 98 (FIG. 9) and the peak region 82 of the counterclockwise wedge 78 prevents the peak region 82 of the counterclockwise wedge 78 from sliding in a clockwise direction relative to the bearing mount 48. Thus, it is understood that it is only possible for the lateral slot protrusions 96, 98 to move relative to the counterclockwise wedge 78 in a counterclockwise direction when the lateral slot protrusion 96, 98 is adjacent to the valley region 86 of the counterclockwise wedge 78. Accordingly, the counterclockwise wedge 78 (and thus the reel 40) may only rotate in counterclockwise direction when the latching member is in the second position 112, as shown in FIG. 5. As the height of the counterclockwise wedge 78 gradually increases from the valley region 86 to the peak region 82, the counterclockwise wedge 78 and the reel 40 may move relative to the lateral slot protrusions 96 of the first panel 49 in a counterclockwise direction. (See FIGS. 9 and 10).

Accordingly, as shown, the latching member 15 may be moveably affixed to the flange 52 of the reel 40. As previously described, the latching member 15 may be configured to restrict rotation of the reel 40 in a particular direction relative to the first panel 49 and base 26 depending upon whether the latching member is in the first position 110 (FIG. 6) or the second position 112 (FIG. 5).

Referring to FIG. 4, a first end 50 of the subscriber cable 46 is arranged on the reel 40 so that the first end 50 can be deployed or paid out from the reel 40 to a remote fiber connection of a FTTX application. In an exemplary embodiment, the subscriber cable 46 may includes four fibers (not shown), and the four fibers (not shown) broken out from a second end 150 of the subscriber cable 46 into separate single-fiber breakout cables (not shown), as would be understood by persons of ordinary skill in the art. The subscriber cable 46 extends from a space between fingers of the reel flange 52 and to a space outside of the reel flange 52 where the fibers (in the case of a multi-fiber cable) of the subscriber cable 46 are broken out into the separate single-fiber breakout cables (not shown). A length 56 of the subscriber cable 46 is disposed in the space outside the reel flange 52 to provide slack for connecting to one or more adapters 76 (FIG. 3). The slack length 56 of the subscriber cable 46 is retained on an outer surface 60 of the reel flange 52 by one or more retaining members 62 that extend from the outer surface 60 of the reel flange 52 in a direction away from the base wall 30. The retaining members 62 define a slack storage path along which the slack length 56 can be held to prevent the slack length 56 from unwinding in a radially outward direction from the reel flange 52. The breakout cables (if present) each have a length that enables connectors 90 that terminate the breakout cables (not shown) to be received by supports 71.

In use, the reel 40 is mounted on the bearing mount 48 and includes the wound subscriber cable 46, the slack length 56 of the subscriber cable 46 in the space outside of the reel flange 52, and the connectors 90 (FIG. 3) of the breakout cables (not shown) and the adapters 76 may be securely received by the supports 71. A technician can then pay out the multi-fiber subscriber cable 46 from the reel 40 by grasping the first end 50 of the subscriber cable 46, passing the first end 50 through one of two openings 64 in a lower wall 38 of the base 26, and deploying the first end 50 (FIG. 4) of the subscriber cable 46 to a desired remote fiber connection of a FTTX application. The reel 40 rotates relative to the tray 68 since the tray 68 is attached (in this case, hingedly attached) to the base 26. Because the reel 40 rotates while the tray 68 (and thus the adapters 76) and base 26 remains stationary, the technician can keep the subscriber cable 46 connected to the adapter(s) 76 while the reel 40 is being rotated to deploy or pay out the subscriber cable 46 to the remote fiber connection. Meanwhile, the tray 68 holds the multiple connectors 90 (FIG. 3) of breakout cables (not shown) that are broken out from a multi-fiber subscriber cable 46 while the reel 40 is being rotated to deploy or pay out the multi-fiber subscriber cable 46 to the remote fiber connection.

It should be understood that the enclosure 12 can include multiple fiber connectors held together, rather than individually, such that the multiple fiber connectors can be removed and plugged in simultaneously. In embodiments, the tray 68 includes a plurality of adapters 76 that are each configured to couple a pair of fiber optic connectors. In the embodiment shown in the figures, the adapters 76 are configured to couple SC connectors. However, in various aspects, the adapters 76 may be configured to couple any fiber optic connector, including but not limited to ST, LC, MU, and MPO connectors.

In the example shown, the lower wall 38 includes the openings 64 configured to receive a cable such as, for example, the subscriber cable 46. In the example shown, each adapter 76 includes a first end 80 (see FIG. 3) configured to receive a connector 90 of one of the breakout cables (not shown) broken out from the multi-fiber subscriber cable 46 and a second end 82 (see FIG. 3) configured to receive a connector of a drop cable (not shown) that runs to an apartment or office of an end user.

Figure 13:
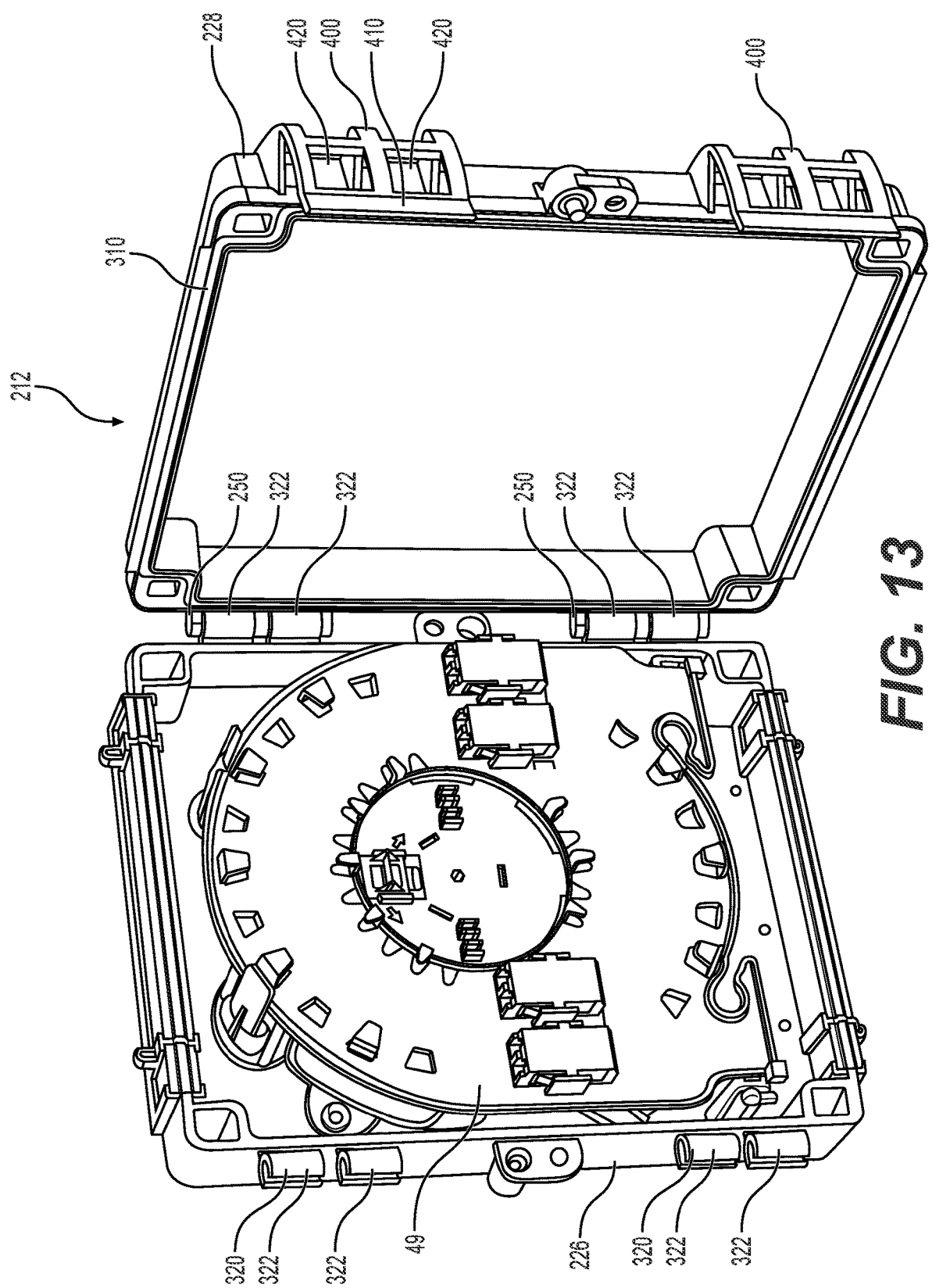
FIG. 13 is a perspective view of an exemplary fiber optic enclosure in accordance with various embodiments of the disclosure with the cover in an open position.
Figure 14:
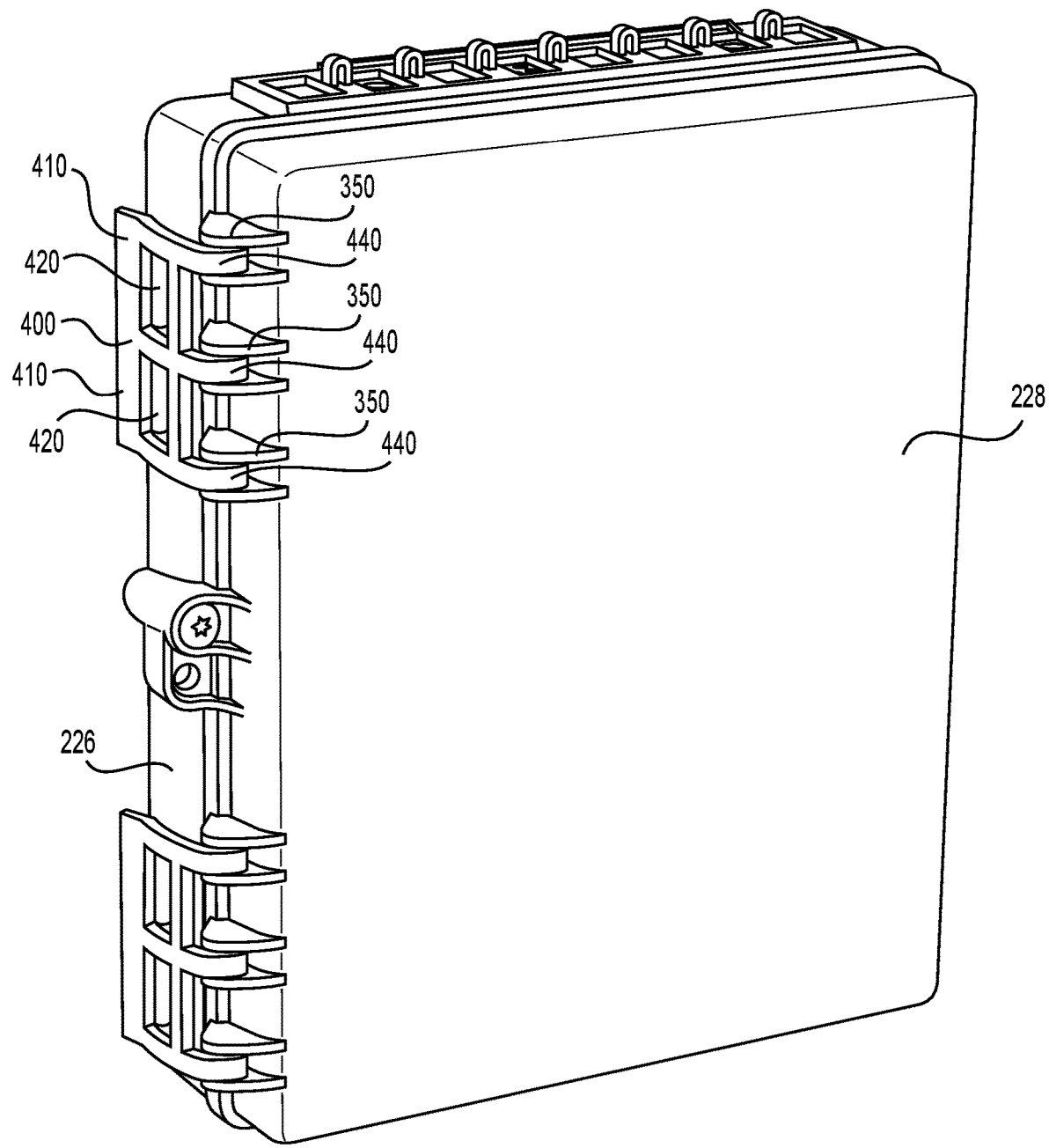
FIG. 14 is a perspective view of the fiber optic enclosure of FIG. 13 with the cover in a closed position.
Figure 15:
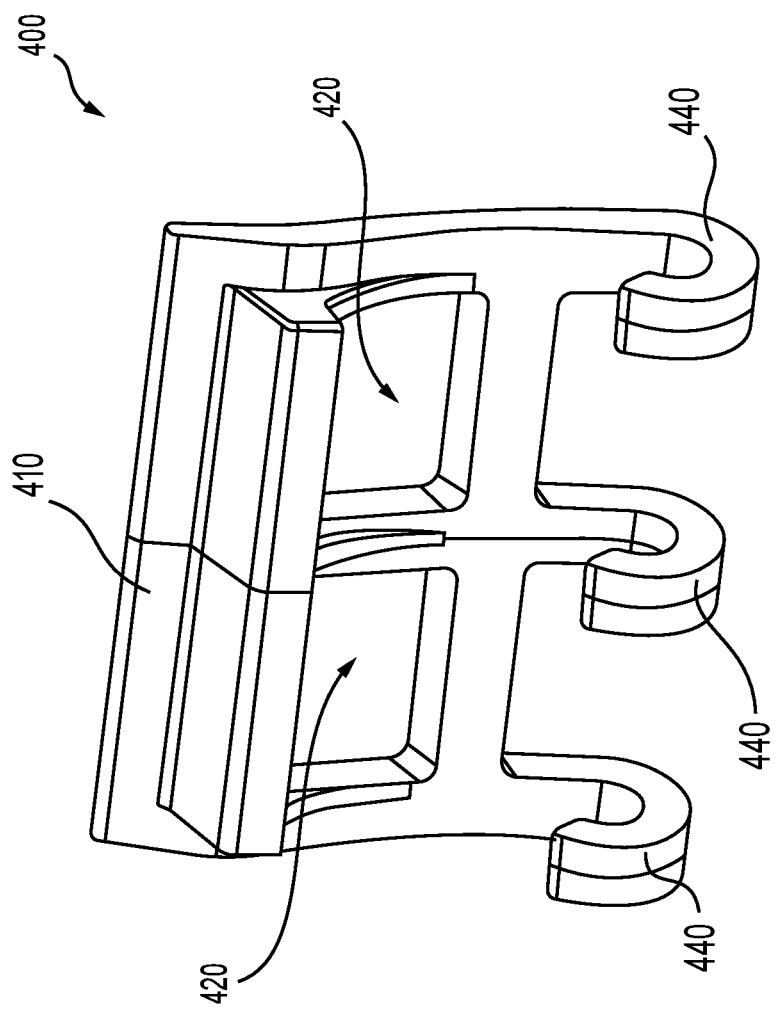
FIG. 15 is a perspective view of a combination hinge/latch of the fiber optic enclosure of FIGS. 13 and 14.

FIGS. 13-15 show an embodiment of a fiber optic enclosure 212 that includes a housing having a base 226 and a cover 228. The fiber optic enclosure 212 is similar to the fiber optic enclosure 12 with the following exemplary exceptions. The cover 28 of the fiber optic enclosure 12 attaches to the base 26 by, in the example shown, four catches. The cover 228 of the fiber optic enclosure 212 attaches to the base 226 by, in this example, two hinges 250 and two cover latches 400. In this example, an O-ring or other seal 310 is located in a recess in the cover 228 to create a watertight seal between the cover 228 and the base 226. Also shown in this example are two access areas (one on the top of the base 226 and one on the bottom of base 226) with removable inserts that can be used to allow access to and from the base 226 for cables or other items.

FIG. 13 shows the base 226 having two catches 320 on each side of the base 226. In this example, each catch 320 has two pairs of oppositely curved fingers 322 that extend outwardly from the base 226. The example shown in FIG. 13 includes two of the cover latches 400 attached to one side of the cover 228. As shown in FIG. 15, each of the cover latches 400 has, in this example, three hooks 440 and a catch area 410. Other examples have fewer or more hooks 440. In this example, each of the cover latches 400 has two catch receiving areas 420. Other examples have fewer or more of the catch receiving areas 420. In embodiments, the number of the catch receiving areas 420 is equal to the number of pairs of the fingers 322 on each of the catches 320.

FIG. 13 shows two of the hinges 250 fixed to a side of the cover 228 opposite to the side to which the cover latches 400 are attached. As shown in FIG. 13, each of the hinges 250 is received in the fingers 322 to retain the hinges 250 and allow the hinges 250 (and thus the cover 228) to pivot relative to the base 226.

FIG. 13 shows the fiber optic enclosure 212 with the cover 228 in an open position and swinging open to the right. In this position, the hinges 250 of the cover 228 are attached to the fingers 322 on the right side of the base 226. Also, in this position, each of the hooks 440 of the cover latches 400 on the left side of the cover 228 are engaged with a corresponding hook receiver 350 on the cover 228 (as shown more clearly in FIG. 14).

FIG. 14 shows the fiber optic enclosure 212 with the cover 228 in a closed position. To close the cover 228 (move from the position shown in FIG. 13 to the position shown in FIG. 14), the cover 228 is pivoted such that the hinges 250 rotate within the fingers 322 on the right side of the base 226. At the end of this pivoting, the catch areas 410 of the cover latches 400 elastically extend outward over the fingers 322 on the left side of the base 226 and spring inward into a position where the fingers are located in the catch areas and the cover 228 is secured in the closed position.

A beneficial aspect of the exemplary embodiment shown in FIGS. 13 and 14 is that the cover 228, base 226, and the cover latches 400 are configured to allow the cover 228 to open to either the left or the right with the same components. In the example shown in FIGS. 13 and 14, the cover 228 opens to the right. The cover 228 can be mounted 180 degrees from the orientation shown in FIGS. 13 and 14 to allow the cover to open to the left. This reversibility results in the catches 320 being configured as both hinge receivers and catches such that they can receive hinges 250 between the fingers 322 and can secure catch receiving areas 420 of cover latches 400. This ability to mount the cover 228 in either opening direction without exchanging any parts is beneficial because it allows in installer or other technician to open the fiber optic enclosure 212 in the direction most convenient given the surroundings in which the fiber optic enclosure is installed. For example, another enclosure, device, or other obstruction located near one side of the fiber optic enclosure 212 might prevent opening the cover 228 in that direction. Also, if necessitated by the environment or some other reason, the cover 228 can be replaceably removed from the base 226 by pulling outward on the catch area 410 of the cover latches 400 on one side of the base 226 to disengage the cover latches 400 from the fingers 322 and pulling the hinges 250 from the fingers 322 on the other side of the housing 226.

While at least one example, non-limiting embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fiber optic enclosure assembly for housing optical fiber connections comprising:
 a base;
 a first panel disposed within the base and including a bearing mount disposed about an axis;
 a cable reel configured to be engaged with the bearing mount such that the cable reel selectively rotates about the axis;
 a pivotable second panel configured to be engaged with the first panel;
 wherein the second panel is configured to be stationary relative to the base;
 wherein the second panel is configured to receive a cable adapter that is fixed relative to the second panel;
 wherein the cable reel includes a reel controller that moves between a first position and a second position;
 wherein the cable reel is permitted to rotate in a counterclockwise direction and prevented from rotating in a clockwise direction when the reel controller is in the first position;
 wherein the cable reel is permitted to rotate in the clockwise direction and prevented from rotating in the counterclockwise direction when the reel controller is in the second position;
 wherein the reel controller is configured to be attached to a flange of the cable reel;
 wherein the reel controller includes a body and a tab extending from the body;
 wherein the reel controller includes a clockwise wedge that extends from the body and is configured to elastically move relative to the body;
 wherein the reel controller includes a counterclockwise wedge that extends from the body and is configured to elastically move relative to the body;
 wherein the reel controller is configured to be received within a slot in the bearing mount;
 wherein the counterclockwise wedge is configured to be received within the slot in the bearing mount when the latch is in the first position;
 wherein the clockwise wedge is configured to be received within the slot in the bearing mount when the latch is in the second position;
 wherein the tab is configured to extend from a first side of the body, and the clockwise wedge and the counterclockwise wedge are configured to extend from a second side of the body opposite the first side of the body; and
 wherein the position of the reel controller is configured to permit the cable reel to rotate in only a selected one of the counterclockwise direction and the clockwise direction such that a cable can be paid out from the cable reel or wrapped onto the cable reel without disturbing an end of the cable that is connected to the enclosure assembly, and the cable is prevented from unwinding in a direction opposite to the selected direction.

2. The fiber optic enclosure assembly of claim 1, wherein the clockwise wedge includes a peak region at a first edge and a valley region at a second edge opposite to the first edge, and wherein the counterclockwise wedge includes a peak region at a first edge and a valley region at a second edge opposite to the first edge; and wherein the peak region of the counterclockwise wedge is configured to abut a protrusion in the slot in the bearing mount so as to prevent the cable reel from rotating in the clockwise direction, and wherein the peak region of the clockwise wedge is configured to abut a protrusion in the slot in the bearing mount so as to prevent the cable reel from rotating in the counterclockwise direction.

3. The fiber optic enclosure assembly of claim 2, wherein the real controller is a latch.

4. The fiber optic enclosure assembly of claim 2, wherein the slot in the bearing mount defines a plurality of openings alternating with a plurality of the protrusion;

wherein the openings are configured to permit the peak regions to move in the slot; and wherein the protrusions are configured to prevent the peak regions to move in the slot.

5. A fiber optic enclosure assembly for housing optical fiber connections comprising:

a base portion;

a first panel portion disposed within the base portion;

a cable reel portion disposed within the base portion;

a tray portion configured to be coupled with the base portion and engage with the first panel portion;

wherein the tray portion is configured to receive a cable adapter portion that is fixed relative to the tray portion;

wherein the first panel portion includes a receiving portion disposed about an axis;

wherein the cable reel portion includes a reel controller;

wherein the reel controller is configured to be engaged with the receiving portion such that the cable reel portion selectively rotates about the axis;

wherein the reel controller includes an engagement portion that is configured to move between a first position and a second position; and wherein the position of the engagement portion is configured to permit the cable reel portion to rotate in only a selected one of the counterclockwise direction and the clockwise direction such that a cable can be paid out from the cable reel portion or wrapped onto the cable reel portion without disturbing an end of the cable that is connected to the enclosure assembly, and the cable is prevented from unwinding in a direction opposite to the selected direction.

6. The fiber optic enclosure assembly of claim 5, wherein the cable reel portion is permitted to rotate in a counterclockwise direction and prevented from rotating in a clockwise direction when the engagement portion is in the first position; and wherein the cable reel portion is permitted to rotate in the clockwise direction and prevented from rotating in the counterclockwise direction when the engagement portion is in the second position.

7. The fiber optic enclosure assembly of claim 5, wherein the engagement portion includes a body portion and a tab portion extending from the body portion.

8. The fiber optic enclosure assembly of claim 7, wherein the tab portion extends from a first side of the body portion, and a first engagement structure and a second engagement structure extend from a second side of the body portion opposite the first side of the body portion.

9. The fiber optic enclosure assembly of claim 8, wherein the first engagement structure extends from the body portion and is configured to elastically move relative to the body portion, and the second engagement structure extends from the body portion and is configured to elastically move relative to the body portion.

10. The fiber optic enclosure assembly of claim 5, wherein the tray portion is configured to pivot relative to the base portion.

11. The fiber optic enclosure assembly of claim 5, wherein the engagement portion is configured to be moveably attached to a flange portion of the cable reel portion.

12. The fiber optic enclosure assembly of claim 8, wherein the receiving portion is a bearing mount portion; and wherein the engagement portion is configured to be received within an engagement feature of the bearing mount portion.

13. The fiber optic enclosure assembly of claim 12, wherein the second engagement structure is configured to be received within the engagement feature in the bearing mount portion when the latch portion is in the first position; and wherein the first engagement structure is configured to be received within the engagement feature in the bearing mount portion when the latch portion is in the second position.

14. A fiber reel and breakout adapter for selectively controlling only loading or only unloading of the fiber reel from the breakout adapter comprising:

a cable reel portion configured to move in a loading direction, where cable is loaded onto the cable reel portion, and an unloading direction, where cable is unloaded from the cable reel portion;

a reel controller configured to selectively move between a first position, where the reel controller allows the cable reel portion to move in the loading direction and prevents the cable reel portion from moving in the unloading direction, and a second position, where the reel controller allows the cable reel portion to move in only the unloading direction and prevents the cable reel portion from moving in the loading direction;

wherein the reel controller comprises a latch portion that includes a first engagement structure that is configured to be fixed relative to a second engagement structure in a radial direction of the cable reel portion so as to enhance slack cable management of a cable having a pre-terminated end portion coupled with the cable reel portion;

wherein the latch portion is configured to attach to the cable reel portion;

wherein the latch portion is configured to engage a bearing mount portion;

wherein the second engagement structure is configured to be received within a recess in the bearing mount portion when the latch portion is in the first position; and wherein the first engagement structure is configured to be received within the recess in the bearing mount portion when the latch portion is in the second position.

15. The fiber reel and breakout adapter of claim 14, wherein the bearing mount portion and the cable reel portion are enclosed by a base portion and a cover portion attached to the base portion.

16. The fiber reel and breakout adapter of claim 14, further comprising a pivotable tray portion configured to engage the bearing mount portion so as to selectively pivot relative to a base portion, and wherein the pivotable tray portion is configured to receive a cable adapter portion that is fixed relative to the pivotable tray portion.

17. The fiber reel and breakout adapter of claim 14, wherein the bearing mount portion and the cable reel portion are enclosed by a base portion and a cover portion attached to the base portion.

18. The fiber reel and breakout adapter of claim 17, further comprising a pivotable tray portion configured to engage the bearing mount portion so as to selectively pivot relative to a base portion, and wherein the pivotable tray portion is configured to receive a cable adapter portion that is fixed relative to the pivotable tray portion.

19. A fiber reel and breakout adapter for selectively allowing or preventing fiber reel loading comprising:
   a cable reel portion configured to move in a cable reel loading direction or a cable reel unloading direction;
   a reel controller configured to selectively move between a first position, where the reel controller allows the cable reel portion to move in the loading direction and a second position, where the reel controller allows the cable reel portion to move in only the unloading direction;
   wherein the reel controller comprises a first latch engagement portion that is configured to be fixed relative to a second latch engagement portion in a radial direction of the cable reel portion so as to enhance slack cable management of a cable having a pre-terminated end portion coupled with the cable reel portion;
   wherein the reel controller comprises a latch portion that is configured to attach to the cable reel portion, wherein the latch portion comprises the first latch engagement portion and the second latch engagement portion;
   wherein the latch portion is configured to engage a bearing mount portion;
   wherein the second engagement portion is configured to be received within a recess in the bearing mount portion when the latch portion is in the first position; and
   wherein the first engagement portion is configured to be received within the recess in the bearing mount portion when the latch portion is in the second position.

\* \* \* \* \*